United States Patent Office 3,682,905
Patented Aug. 8, 1972

3,682,905
PHOSPHINO, PHOSPHONODITHIOIC ACID SECONDARY OR TERTIARY HETEROCYCLIC AMINE SALTS
Stanley B. Mirviss, Stamford, Conn., and Melvin M. Schlechter, Merrick, N.Y., assignors to Stauffer Chemical Company, New York, N.Y.
No Drawing. Continuation-in-part of application Ser. No. 806,692, Mar. 12, 1969, which is a continuation-in-part of application Ser. No. 517,950, Jan. 3, 1966. This application Sept. 2, 1970, Ser. No. 69,158
Int. Cl. C07d 87/46
U.S. Cl. 260—247.1         8 Claims

ABSTRACT OF THE DISCLOSURE

Novel organophosphorus amine salts of the formula

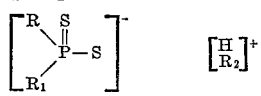

wherein R and $R_1$ are selected from the group consisting of alkyl of from 1 to 20 carbon atoms, phenyl and benzyl; and $R_2$ is an amine selected from the group consisting of secondary and tertiary heterocyclic amines.

CROSS-REFERENCE TO RELATED APPLICATION

This application is a continuation-in-part of application Ser. No. 806,692, filed Mar. 12, 1969, now abandoned which is a continuation-in-part of application Ser. No. 517,950, filed Jan. 3, 1966, now abandoned, for "Novel Organophosphorus Amine Salts."

This invention relates to novel organophosphorus amine salts. More particularly, this invention is concerned with novel heterocyclic amine salts of aromatic and aliphatic phosphinophosphonodithioic acids which are useful as light (ultra-violet) stabilizers for poly-alpha-olefin compositions.

It is known that plastic and polymeric materials generally undergo degradation in the presence of light and/or heat. Especially sensitive to these agencies are some of the synthetic resins such as polyethylene, polypropylene and the like. In order to increase the life of plastics and polymers, it has become the practice to incorporate therein certain substances, usually referred to as ultra-violet absorbers which are capable of absorbing the incident actinic radiation, thereby protecting the plastic substrate from deterioration.

We have now discovered that certain heterocyclic amine salts are effective in protecting poly-alpha-olefins against the deleterious effects of light, and the provision of such compounds constitutes the primary purpose and object of this invention.

Another object of the invention is to provide poly-alpha olefin compositions stabilized with the above-named compounds.

Other objects will be apparent from the detailed description which follows.

The novel compounds of the invention may be represented by the general formula

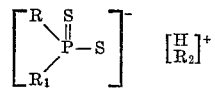

wherein R and $R_1$ are selected from the group consisting of alkyl, aryl, and aralkyl; and $R_2$ is an amine selected from the group consisting of secondary and tertiary heterocyclic amines. Representative examples would include pyridine, thiazine, morpholine, oxazine, piperazine, pyridazine, pyrimidine, pyrazine, quinoline, thiomorpholine, 1,4-dimethylpiperazine, indole, piperidine, and the like. The alkyl substituents may have from 1 to 20 carbon atoms.

The novel compounds of the invention are prepared by reacting an aromatic or aliphatic phosphinodithioic acid with a secondary or tertiary heterocyclic amine. An inert organic solvent such as benzene, toluene, acetone and the like is preferred but none is required.

We have discovered that generally excellent results are achieved when the starting materials are reacted at room temperature but the temperature range is not critical. Temperatures as low as 0° C. and as high as 200° C. may be maintained and generally the upper limit is the boiling point of the solvent.

Stoichiometric quantities of reactants are used and the reaction goes rapidly to completion. The crystalline precipitate formed is dried to produce a product having a yield in excess of 80%.

The following examples which are illustrative of the invention should not be construed as limiting examples, for variations and modifications thereof will be apparent to one having ordinary skill in this art.

PREPARATION OF THE COMPOUNDS

Example 1

Pyridine salt of diphenylphosphinodithioic acid

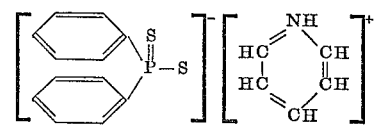

To an Erlenmeyer flask containing 10 g. (0.04 mole) of diphenyl-phosphinodithioic acid and 50 cc. of benzene was added 3.10 g. (0.04 mole) of pyridine. A white precipitate immediately appeared. The mixture was stirred for 15 minutes at room temperature and filtered in a Buchner funnel. After drying the precipitate was found to have an analysis of 19.2% S and 8.9% P as compared to 19.5% S and 9.4% P, theoretical, and a melting point of 167–175° C. The yield was calculated as 81% of theoretical.

Using the procedure of Example 1, the following compounds were prepared.

Example 2

Morpholine salt of diphenylphosphinodithioic acid

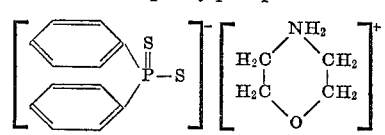

having an analysis of 18.5% S and 4.3% N, as compared to 19.0% S and 4.2% N, theoretical, and a melting point of 213–220° C.

Example 3

Piperazine salt of diphenylphosphinodithioic acid

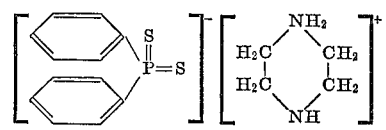

having an analysis of 18.4% S and 8.3% N, as compared to 18.8% and 8.3% N, theoretical, and a melting point of 220–228° C.

The following compounds are prepared in accordance with the procedure of Example 1.

Example 4
Pyridine salt of benzyl phenylphosphinodithioic acid

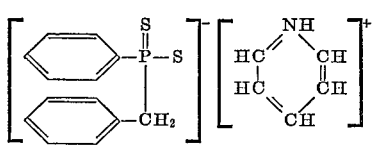

Example 5
Pyridine salt of O-ethyl naphthylphosphinodithioic acid

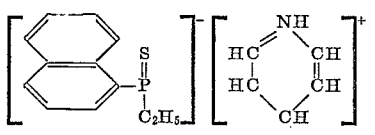

Example 6
Quinoline salt of diphenylphosphinodithioic acid

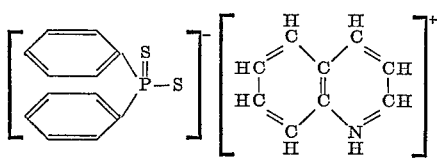

having an analysis of 16.7% S and 4.0% N, as compared to 16.9% S and 3.7% N theoretical with a melting point of 211–218° C.

Example 7
Thiomorpholine salt of diphenylphosphinodithioic acid

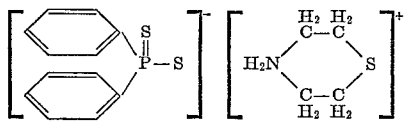

having an analysis of 27.4% S and 3.9% N, as compared to 27.1% S and 3.9% N theoretical.

Example 8
1,4-dimethylpiperazine salt of diphenylphosphinodithioic acid

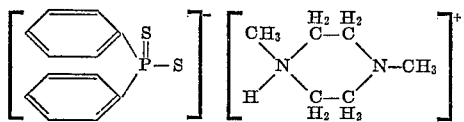

having an analysis of 7.0% N and 18.2% S, as compared to 17.6% S and 7.7% N, which indicates that some of the bis-salt is present as an impurity:

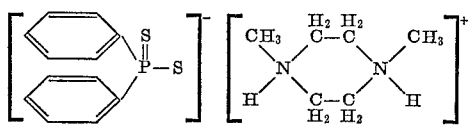

Example 9
Indole salt of diphenylphosphinodithioic acid

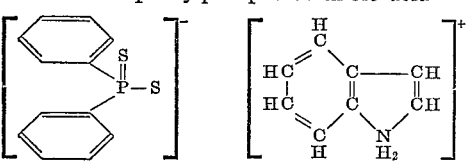

having an analysis of 3.5% N and 18.0% S, as compared to 3.8% N and 17.5% S theoretical.

Example 10
Piperidine salt of diphenylphosphinodithioic acid

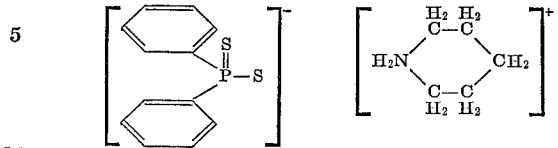

having an analysis of 4.0% N and 18.8% S, as compared to 19.1% S and 4.2% N theoretical with a melting point of 208–215° C.

The ultra-violet stabilizer compounds contemplated by the invention may be blended or incorporated into the polyalpha-olefin compositions by any of the conventional methods commonly used for mixing such materials with resins and plastics. For example, milling on heated rolls, deposition from solvents and dry blending are applicable well-known techniques.

In order to prepare poly-alpha-olefin compositions which are resistant to prolonged exposure to sunlight and the elements, it is preferred that the concentration of the novel compounds be maintained in the range of 0.01 to about 5.0% based on the weight of the polymer.

Although the molecular weight of poly-alpha-olefins varies over wide limits, the compounds of the invention are not restricted to any particular molecular weight range. Poly-alpha-olefins ranging in molecular weight from about 15,000 to about 400,000, however, are afforded particularly excellent protection.

Dry blends consisting of 0.5% by weight of each of the compounds of Examples 1 to 6 and 50 grams of isotactic polypropylene were subjected to compression molding in the usual manner at a temperature of 400° F. for six minutes at 2000 p.s.i. The blended polymers were compression molded or extruded into 25 mil sheets and thereafter cut into square samples measuring 2 inches on the side. A like sample containing no stabilizer was also prepared and tested. The samples were then exposed in a Xenon Arc Weatherometer operating at 6000 watts. The water cycle was adjusted whereby each sample was subjected to 18 minutes of water spray and 102 minutes of dry exposure for each two hours of exposure. Exposure damage to the samples of polypropylene was assessed with respect to change of structural strength.

After a period of exposure in excess of 600 hours, none of the test sheets of polypropylene showed signs of brittleness when flexed at an angle of 180° and three of the test sheets showed no signs of brittleness when flexed after 800 hours of exposure. A blank specimen of unstabilized polypropylene which was exposed concurrently with the stabilized product failed the flexure test after 250 to 300 hours exposure time.

The polypropylene resin as used in the above-described example is an unstabilized general purpose, high molecular weight polypropylene of the isotactic or crystalline type. Typically, it has a melt index of 4 at 230° F. and a specific gravity of 0.905.

We claim:
1. An amine salt of the formula:

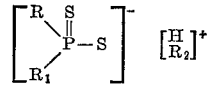

wherein R and $R_1$ are selected from the group consisting of alkyl of from 1 to 20 carbon atoms, phenyl, naphthyl and benzyl; and $R_2$ is a secondary or tertiary heterocyclic amine selected from the group consisting of pyridine, thiazine, morpholine, oxazine, piperazine, pyrimidine, pyrazine, quinoline, thiomorpholine, 1,4-dimethyl piperazine, indole and piperidine.

2. The compound of claim 1 wherein R and $R_1$ are phenyl and $R_2$ is pyridine.

3. The compound of claim 1 wherein R and $R_1$ are phenyl and $R_2$ is morpholine.

4. The compound of claim 1 wherein R and $R_1$ are phenyl and $R_2$ is piperazine.

5. The compound of claim 1 wherein R and $R_1$ are phenyl and $R_2$ is quinoline.

6. The compound of claim 1 wherein R and $R_1$ are phenyl and $R_2$ is piperidine.

7. The compound of claim 1 wherein R and $R_1$ are phenyl and $R_2$ is indole.

8. An amine salt of claim 1 wherein the amine is pyridine.

No references cited.

ALEX MAZEL, Primary Examiner

J. TOVAR, Assistant Examiner

U.S. Cl. X.R.

260—243 B, 250 R, 250 A, 251 P, 268 K, 286 R, 293.73, 294.8 K, 326.12 R, 45.8 SN, 45.8 NZ; 252—402

UNITED STATES PATENT OFFICE
CERTIFICATE OF CORRECTION

Patent No. 3,682,905      Dated August 8, 1972

Inventor(s) Stanley B. Mirviss and Melvin M. Schlechter

It is certified that error appears in the above-identified patent and that said Letters Patent are hereby corrected as shown below:

Column 2, formula in Example 3, the "P" is double bonded to the right to "S", and it should be a single bond, that is, -- P - S --; Column 2, line 68, after "18.8%", insert -- S --. Column 3, the formula in Example 5, the "P" should be single bonded to the right to an "S", that is --P-S--.

Signed and sealed this 30th day of January 1973.

(SEAL)
Attest:

EDWARD M. FLETCHER, JR.
Attesting Officer

ROBERT GOTTSCHALK
Commissioner of Patents